(12) United States Patent
Landivar

(10) Patent No.: US 8,037,415 B1
(45) Date of Patent: Oct. 11, 2011

(54) SYSTEMS, METHODS, AND COMPUTER READABLE MEDIA FOR MANAGING A HOSTS FILE

(75) Inventor: Luis Fernando Landivar, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 750 days.

(21) Appl. No.: 11/859,636

(22) Filed: Sep. 21, 2007

(51) Int. Cl.
*G06F 13/00* (2006.01)
*G06F 15/00* (2006.01)

(52) U.S. Cl. ........................ 715/734; 715/738

(58) Field of Classification Search .......... 715/763–765, 715/734–740, 851–854; 709/203, 245
See application file for complete search history.

(56) References Cited

U.S. PATENT DOCUMENTS

| | | | |
|---|---|---|---|
| 5,708,780 A | 1/1998 | Levergood et al. | |
| 6,286,047 B1 | 9/2001 | Ramanathan et al. | |
| 6,658,461 B1 * | 12/2003 | Mazo | 709/217 |
| 7,487,546 B1 | 2/2009 | Szor | |
| 2004/0260798 A1 | 12/2004 | Addington | |
| 2005/0005026 A1 * | 1/2005 | Brown et al. | 709/245 |

OTHER PUBLICATIONS

Bogdan, N., "Free source rapid access 'hosts' file editor—easily manage mappings of IPs to Host names or URL's," http://delphi.about.com/library/weekly/aa071304a.htm?p=1, 2007, downloaded Aug. 22, 2007, 2 pages.
"HijackThis—Edit your Hosts File," *MalekTips*, http://www.malektips.com/hijackthis_0007 p.html, downloaded Aug. 22, 2007,1 page.
McMillian, A., "Visual Basic Code: Control your Hosts File with the Hosts Collection," http://www.paradoxes.info/code/HostsCollection.html, downloaded Aug. 22, 2007, 11 pages.
"Modify The Hosts File," *PC TechBytes*, http://www.pctechbytes.com/computer/article-15.html, 2007, downloaded Aug. 22, 2007, 2 pages.
Otey, M., "Building a Graphical HOSTS File Edit Utility," *Windows It Pro*, http://www.windowsitpro.com/Articles/ArticleID/561/561.html?Ad-1, 1997, downloaded Aug. 22, 2007, 3 pages.
Phelps, E., "The Most Important Trick," *Hosts File Utilities*, http://www.ericphelps.com/scripting/samples/Hosts/, downloaded Aug. 22, 2007, 4 pages.
Trahan, B., "Edit the Windows Vista Hosts File," http://www.maximumpcguides.com/edit-the-windows-vista-hosts-file/, 2007, downloaded Aug. 22, 2007, 1 page.

* cited by examiner

*Primary Examiner* — Cao "Kevin" Nguyen
(74) *Attorney, Agent, or Firm* — Brooks, Cameron & Huebsch, PLLC

(57) ABSTRACT

A hosts file manager is provided that displays a user interface with a list of selectable server groups. The list may comprise, for example, identifications server groups. Each server group corresponds to an IP address, and the hosts file manager has access to such IP address data. A user selection of a first server group may be made and received via said user interface. A computer's hosts file may then be modified to correlate a hostname with an IP address of the selected server group.

23 Claims, 7 Drawing Sheets

SYSTEMS, METHODS, AND COMPUTER READABLE MEDIA FOR MANAGING A HOSTS FILE

BACKGROUND

A hosts file is an electronic file that correlates hostnames to Internet Protocol (IP) addresses. It is used by software applications that access computer networks, e.g., browsers such as INTERNET EXPLORER®, SAFARI® or FIREFOX®, as well as any number of other network-enabled applications prevalent today, to determine an IP address for a node on a network. The hosts file is often used in addition to the Domain Name System (DNS). DNS provides a network-accessible directory of IP addresses for the Internet, while the hosts file provides a local directory that is stored, for example, on a Personal Computer (PC) local hard drive.

Because the hosts file is locally controlled, and its contents can be tailored to the specific wishes of a computer user, network-enabled software applications often give hosts file mappings priority over mappings from other locations, such as DNS. For example, if a user configures his hosts file to point to a specified IP address for a particular hostname, most commercial browser applications will go to that specified IP address, even if it differs from an address that would otherwise be retrieved through DNS. While hosts file information takes precedence, the hosts file is infrequently used today, because DNS provides Internet users with nearly all of the IP addresses they need.

Many modern operating systems include a hosts file with operating system software. The file may have certain operating-system-specific layout and behavior properties, however many systems follow a Unix-like convention for configuration files, with a plain text format. For example, the file may list an IP address, followed by a list of names for that node. Any comments may be introduced with a hash mark ("#"). However, operating systems do not presently include automated approaches to managing the hosts file. If a computer user wants to modify a computer's hosts file, he will typically navigate to the file location in his operating system's file structure, open the file, type any desired modifications using a keyboard input device, then save and close the file.

The above approach can be cumbersome in situations where hosts file modifications are frequently made. There is a need in the industry for a hosts file manager that allows for hosts file modifications using more automated, less error prone technologies.

SUMMARY

Systems, methods, and computer readable media are provided for managing a hosts file. In one embodiment, a method is provided comprising displaying a user interface with a list of selectable server groups. The list may comprise, for example, identifications server groups. Each server group corresponds to an IP address, and the hosts file manager has access to such IP address data. A user selection of a first server group may be made and received via said user interface. A computer's hosts file may then be modified to correlate a hostname with an IP address of the selected server group. Finally, the modified hosts file may be stored, as modified, on a computer readable medium.

In another embodiment, a method may be employed for facilitating test access to server groups that supply services for a common hostname. Such method may comprise maintaining hosts file manager data comprising at least one IP address for at least one server group. A hosts file manager program may be deployed to at least one computer, said at least one computer having network access to the at least one server group. Once deployed, the hosts file manager may receive a selection, for example a user selection, of a server group from said at least one server group. The hosts file manager can then modify a hosts file for said at least one computer by correlating, in said hosts file, an IP address for the selected server group with said common hostname. Finally, the hosts file as modified can be stored on a computer readable medium.

In another exemplary embodiment, a method for managing a hosts file is provided that may comprise, for example, providing a list of selectable server groups, each server group serving a common hostname, and each server group corresponding to a unique IP address. A button can be provided that activates an automatic modification of a hosts file by inserting an entry correlating said common hostname with a unique IP address associated with a selected one of said server groups. Again, the hosts file as modified can be stored on a computer readable medium.

Other aspects and features of the exemplary disclosed embodiments are described below.

BRIEF DESCRIPTION OF THE DRAWINGS

The systems and methods for managing a hosts file in accordance with the disclosed embodiments are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure, however, to avoid unnecessarily obscuring the various disclosed embodiments. Further, those of ordinary skill in the relevant art will understand that they can practice other embodiments without one or more of the details described below. Finally, while various methods are described with reference to steps and sequences in the following disclosure, the description as such is for providing a clear implementation disclosed embodiments, and the steps and sequences of steps should not be taken as required to practice all embodiments.

Figure 1:
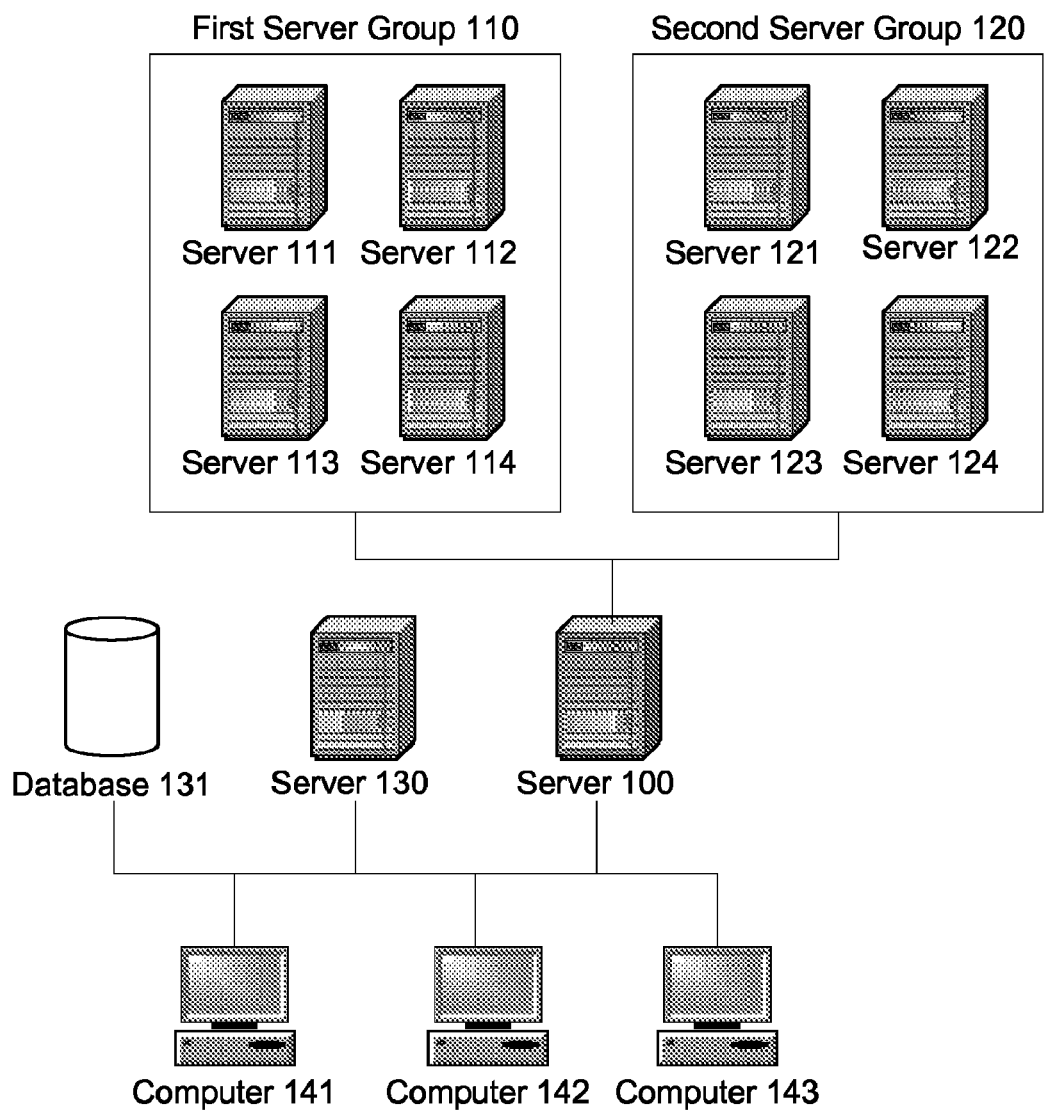
FIG. 1 provides a schematic diagram illustrating an exemplary network comprising a first server group and a second server group that may support a common hostname.

FIG. 1 provides a schematic diagram illustrating a network comprising a first server group 110 and a second server group 120 that may support a common hostname. A hostname, occasionally also referred to as a sitename, is a unique name by which a network-attached device such as server 100, or group of devices such as server 100 and server groups 110 and 120, or possibly other electronic devices such as a file servers, network storage devices, fax machines, copiers, cable modems, etc., are known on a network. A hostname is used to identify a particular host in networked electronic communications such as those occurring on the Internet. On the Internet, the terms "hostname" and "domain name" are often used interchangeably.

Hostnames are used by various naming systems such as DNS, Network Information Service (NIS), and Server Message Block (SMB). While the exact form of a hostname varies depending on the naming system in question, which in turn varies by type of network, for the purpose of this disclosure the term "hostname" refers to any hostname, regardless of the definitional requirements of any particular network or naming system. Thus while a hostname meaningful to NIS may not be a valid Internet hostname, both NIS and Internet hostnames are nonetheless hostnames as the term is used herein, and as will be appreciated by those of skill in the art.

A large number of hostnames today are Internet hostnames, where DNS is the naming system, and therefore the term "hostname" specifically includes Internet hostnames. On the Internet, a hostname is a domain name assigned to the host. This is usually a combination of the host's local name with its parent domain's name. This kind of hostname is translated into an IP address via a computer's local hosts file, or via the DNS resolver. Thus, for example, when a user of a computer 141 points his browser to the hostname "www.abccorp.com," this hostname is translated into an IP address by either consulting the computer's hosts file, or by consulting DNS. As a result, computer 141 is pointed to an IP address, e.g., 167.24.111.254, and retrieves information from that address.

An Internet Protocol (IP) address, as the term is used herein, refers to is a unique address that electronic devices use to identify and communicate with each other on a computer network that implements the Internet Protocol standard. Any participating network device—including routers, computers, time-servers, printers, Internet fax machines, and some telephones—can have its own unique IP address. IP addresses can appear to be shared by multiple client devices either because they are part of a shared hosting web server environment or because a Network Address Translator (NAT) or proxy server acts as an intermediary agent. IP addresses are managed and created by the Internet Assigned Numbers Authority (IANA). The IANA generally allocates superblocks to Regional Internet Registries, who in turn allocate smaller blocks to Internet service providers and enterprises.

There are presently two versions of the Internet Protocol standard: Version 4 and Version 6. The term "IP address" refers to an IP address that conforms to either of these or any later developed version. Each version has its own definition of an IP address. IPv4 uses 32-bit addresses, while IPv6 addresses are 128 bits. While IPv4 addresses are presently most prevalent, IPv6 is increasingly used, for example by recent releases of popular operating systems such as WINDOWS VISTA® and MAC OS X®.

While server groups 110 and 120, and server 100 in FIG. 1 support a common hostname, e.g. "www.abccorp.com", it is contemplated that these servers in fact have different IP addresses. Thus, a request by computer 141 for the hostname "www.abccorp.com" may point the computer 141 to server 100, or to server group 110, or to server group 120, depending on the circumstances that ultimately point the computer 141 to a particular IP address.

For example, if computer 141 requests the hostname "www.abccorp.com" and uses DNS to retrieve the appropriate IP address, the IP address will be that of the server 100, and computer 141 will be directed to server 100. Server 100 may, in turn, direct computer 141 to either server group 110 or server group 120, at the discretion of server 100. Server 100 may use any of a wide variety of criteria to determine whether to direct a particular request to 110 or to 120. For example, server 100 may keep track of the load on each of server groups 110 and 120, and may direct a particular request to a server group with the lowest load. Any number of additional criteria may be used, for example, a time of the request, a nature of the request, whether a server group is disconnected for maintenance or otherwise unavailable, and so on.

Similarly, if computer 141 comprises a hosts file that specifies an IP address for server 100, without further specifying a particular server group such as 110 or 120, then computer 141 will be directed to server 100 just as if DNS was used to discover the IP address for the requested hostname. Again, server 100 may determine an appropriate server group 110 or 120 to service the request of computer 141, and server 100 may point computer 141 to the IP address for the chosen server group.

However, it is also possible for a computer such as 141 to comprise a hosts file that correlates a particular IP address for a particular server group, e.g., server group 110, with a hostname such as "www.abccorp.com". In this scenario, when computer 141's request for services arrives at server 100, server 100 does not choose an appropriate server group, as before, but instead routes the request to the particularly identified server group. For example, if computer 141 comprises a hosts file that correlates the IP address for server group 110 with the common hostname supported by server 100 and server groups 110 and 120, then computer 141, upon a request for the common hostname, will be pointed to server group 110, and not server group 120. Similarly, computer 141 may comprise a hosts file that correlates the IP address for server group 120 with the common hostname supported by server 100 and server groups 110 and 120, in which case computer 141, upon request for the common hostname, will be pointed to server group 120, and not server group 110.

It is desirable in certain scenarios to point to the IP address for a particular server group, and to thus know which server group a computer such as 141 is communicating with. One exemplary scenario is that of testing. Changes may be made to a server group such as 110, while the changes are not made to another group such as 120. Desiring to test server group 110, it is necessary to connect with that group, and not be accidentally routed to group 120. Other scenarios in which it is desirable to connect to a particular server group that supports a common hostname can also be foreseen. For example, server group 110 may be equipped with certain features not available on server group 120.

Modifying the hosts file in such scenarios allows one to ensure contact with precise server groups. Referring to FIG. 1, it is contemplated that a hosts file manager application may be stored on server 130, and that such application can be deployed from server 130 to computers 141-143. For example, in one embodiment, a hosts file manager application can be downloaded by computers 141-143 from server 130, by navigating to a location of such application on server 130 and copying the application files to a location on the local hard disk contained within computers 141-143.

Aspects of the operation of the hosts file manager application are described below with reference to FIGS. 2-7. Generally speaking, the hosts file manager application is equipped with IP addresses for server groups such as 110 and 120 that are associated with a common hostname. The hosts file manager data can store such IP addresses alongside "friendly names" or identifiers for the server groups, such as "red cell," and "blue cell," or "Seattle Group" and "San Antonio Group," as appropriate to indicate to users of the hosts file manager which server group is referred to. This hosts file manager data may be coded into the hosts file manager application itself, or may be stored in a network accessible location such as database 131, which may contain the data in a format such as Extensible Markup Language (XML).

When launched, the hosts file manager displays to a user of a computer 141 the list of friendly name identifiers for server groups. The user selects a desired server group, e.g., server group 110, and the hosts file manager thereafter modifies the hosts file on computer 141 to correlate the IP address for the selected server group 110 with the common hostname.

Figure 2:
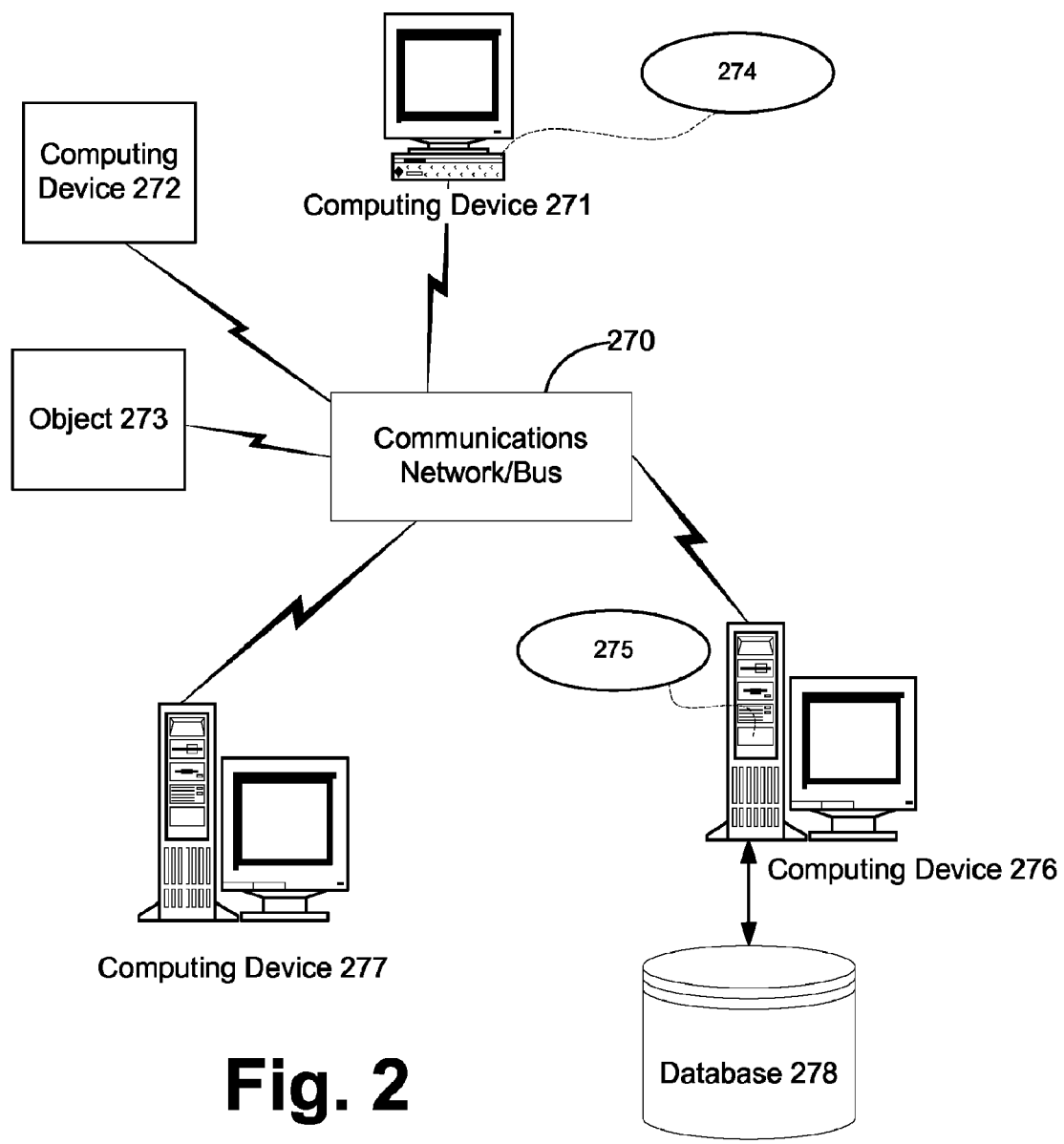
FIG. 2 illustrates networked computing devices for the purpose of disclosing aspects of a computer network as may be implemented in various embodiments.

Referring now to FIG. 2, an exemplary networked computing environment is provided as may be used in connection with various embodiments. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing uses network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the disclosed embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to utilize the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as a hostname which resolves to a Internet Protocol (IP) address can be used to identify the server or client computers to each other. A network address is also sometimes referred to as a URL address. Communication can be provided over a communications medium, e.g., client(s) and server(s) may be coupled to one another via TCP/IP connection(s) for high-capacity communication.

Figure 3:
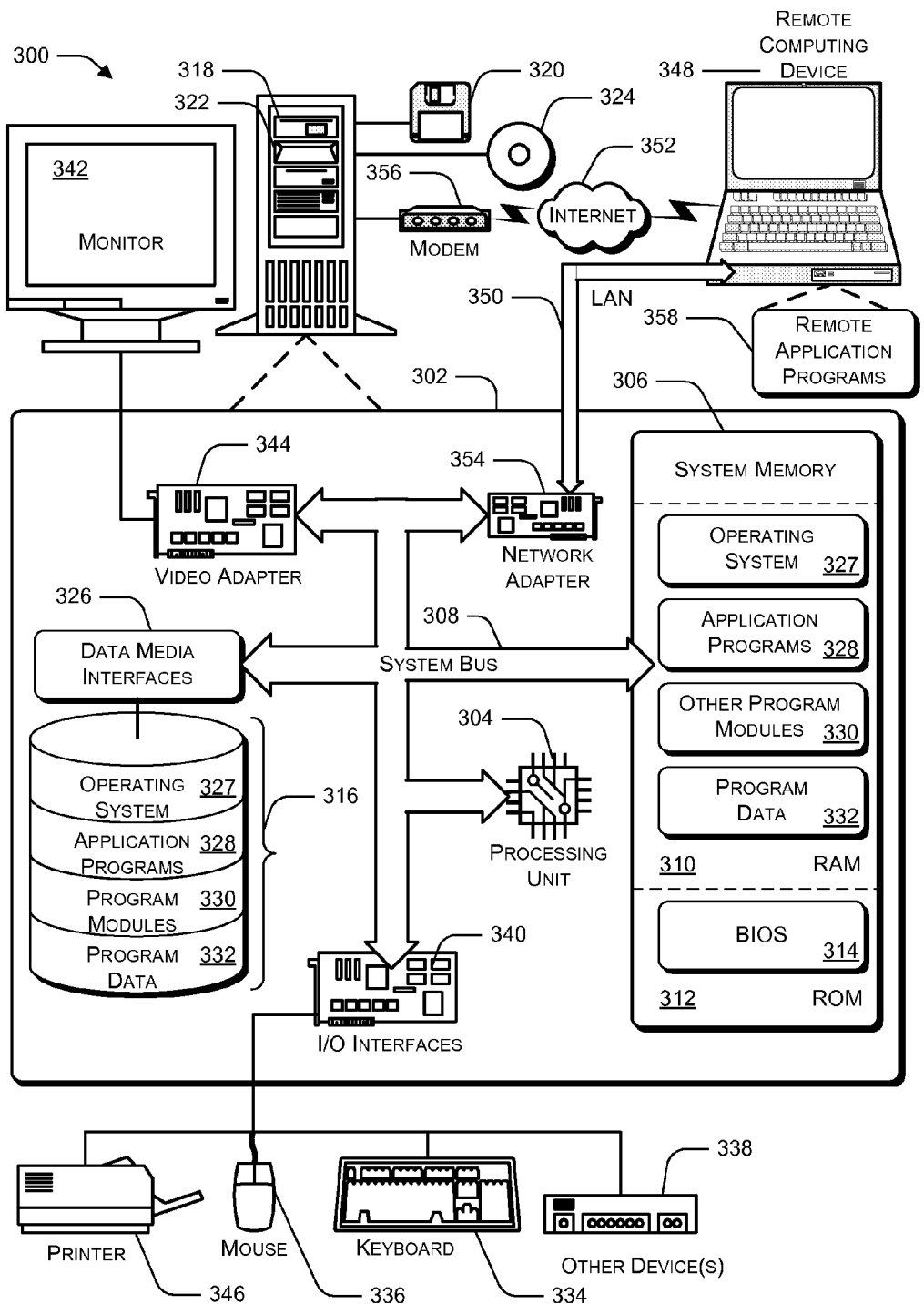
FIG. 3 illustrates an exemplary computing device as may be configured to implement disclosed embodiments.

An exemplary general purpose computer as may be utilized in conjunction with disclosed embodiments is illustrated in FIG. 3. Device electronics 300 are illustrated in FIG. 3, and a schematic blowup 302 is provided to illustrate an exemplary internal architecture of the device. Computing architecture 302 includes one or more processors or processing units 304, a system memory 306, and a bus 308 that couples various system components including the system memory 306 to processors 304.

The bus 308 represents one or more of any of several types of bus structures, including a memory bus or memory controller, a peripheral bus, an accelerated graphics port, and a processor or local bus using any of a variety of bus architectures. The system memory 306 includes read only memory (ROM) 312 and random access memory (RAM) 310. A basic input/output system (BIOS) 314, containing the basic routines that help to transfer information between elements within computing device 300, such as during start-up, is stored in ROM 312.

Computing architecture 302 further includes persistent memory such as a hard disk drive 326, and may include a magnetic disk drive 318 for reading from and writing to a removable magnetic disk 320, and an optical disk drive 322 for reading from or writing to a removable optical disk 324 such as a CD ROM or other optical media. The hard disk drive 326, magnetic disk drive 318, and optical disk drive 324 are connected to the bus 308 by appropriate interfaces. The drives and their associated computer-readable media provide nonvolatile storage of computer-readable instructions, data structures, program modules and other data for computing device 300. Although the exemplary environment described herein employs a hard disk, a removable magnetic disk 318 and a removable optical disk 324, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 326, magnetic disk 318, optical disk 324, ROM 312, or RAM 310, including an operating system 327, one or more application programs 328, other program modules 330, and program data 332. Such program modules combined with computer 300 electronics are referred to herein as "components" and/or "subsystems" of the system illustrated in FIG. 3, because when combined in this way computer hardware and program module become an integrated physical system designed to carry out the purpose of the program module.

A user may enter commands and information into computing device 300 through input devices such as a keyboard 334 and a pointing device 336. An image capture device 346 may also be coupled to the general purpose computer 300 as an input device. Other input devices 338 may include a microphone, joystick, game pad, satellite dish, or the like. These and other input devices are connected to the processing unit 304 through interfaces 340 that are coupled to the bus 308. A monitor 342 or other type of display device is also connected to the bus 308 via an interface 324, such as a video adapter 324.

Generally, the data processors of computing device 300 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory 306.

Computing device 300 may operate in a networked environment using logical connections to one or more remote computers 348, such as one or more server computers, routers, network PCs, and so forth, which typically include many or all of the elements described above relative to computing device 300. The remote computer 348 may run remote application programs 358 which may operate in concert with application programs 328 that execute on the computer 300. For example, a software component may, in one embodiment, execute pursuant to commands from a remote application program 358. The software component may of course also operate in a more autonomous manner, performing certain tasks and then communicated data as necessary back to the remote application programs 358.

When used in a LAN networking environment, a computer 300 is connected to a local network 350 through a network interface or adapter 354. When used in a WAN networking environment, computing device 300 typically includes a modem 356 or other means for establishing communications over the wide area network 352, such as the Internet. The modem 356, which may be internal or external, can be connected to the bus 308 for example via a serial port interface, or by sending a signal to a wireless router which then broadcasts and receives wireless signals to and from a wireless card that is connected to the computer 300.

In a networked environment, program modules depicted relative to the computing device 300, or portions thereof, may be stored in the remote memory storage device. It will be appreciated that the network connections shown are exemplary and other means of establishing a communications link between the computers may be used.

Figure 4:
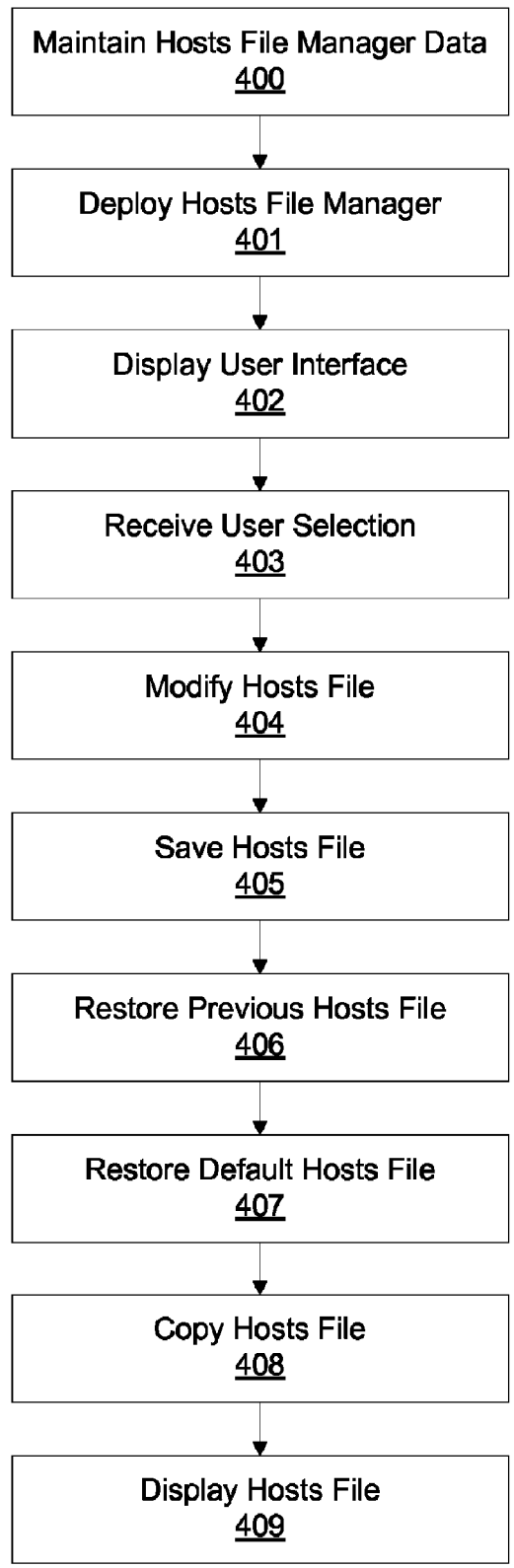
FIG. 4 illustrates steps of a method, as may be carried out as a method or implemented in the form of computing components or instructions stored on computer readable media, for maintaining, deploying, and utilizing a hosts file manager in accordance with disclosed embodiments.

Referring now to FIG. 4, a method is illustrated which may be carried out in one exemplary embodiment. It will be appreciated that FIG. 4 also illustrates, at least in part, computer readable instructions that may be stored on a computer readable medium and/or program modules which can be combined with computing hardware to form electronic subsystems for carrying out the various illustrated steps.

FIG. 4 illustrates a method for modifying a hosts file, comprising maintaining hosts file manager data 400. Maintaining hosts file manager data 400 may be accomplished, in one embodiment, by updating the code for a hosts file manager application each time new hosts file manager data becomes available. For example, if an IP address for a first server group changes, the code for a program manager application may also be changed, to ensure that when the first server group is selected, the application will modify a hosts file to correlate the new IP address with the hostname. This embodiment contemplates that the hosts file manager application will be re-deployed to computers each time the application changes, so that computers using it will have the most recent hosts file manager data, i.e. the most recent correlations between server group identifications and corresponding IP addresses.

In another embodiment, the program manager application may be configured to dynamically retrieve hosts file manager data available at a network location. For example, each time a program manager application is launched, it may contact a web service, database, networked file, or the like to retrieve hosts file manager data from a centralized repository. This embodiment is useful because is allows "one and done" deployment of a hosts file manager application to computers. Unlike the "code update" approach described above, the dynamic data discovery embodiment does not require the hosts file manager to be modified and redeployed when hosts file manager data changes. Instead, the hosts file manager simply retrieves the most recent hosts file manager data each time it starts up.

Maintenance of hosts file manager data 400 in either of the above described embodiments may be accomplished by a human or an automated process. Human modification is done by tracking any enterprise changes to server groups associated with the enterprise hostname (and any other server groups as convenient for particular embodiments), and manually making corresponding changes to hosts file manager code or a central repository of hosts file manager data. For example, hosts file manager data may be maintained by adding to said list of selectable server groups a third identification of a third server group (in addition to groups 110 and 120 from FIG. 1) that corresponds to a third IP address, and updating said hosts file manager data with said third identification of a third server group and said third IP address.

Automated process modification is accomplished in the same way, except automatically. In other words, an automated process discovers IP address changes, additions, and subtractions from the server groups that support a common enterprise hostname. These modifications are then automatically translated to changes in a hosts file manager application, or to a central repository that is accessed by hosts file manager configured for dynamic access to such central repository.

Deploying the hosts file manager in step 401 comprises transferring the executable file corresponding to the hosts file manager to the various computers, e.g. 141-143 in FIG. 1, that will use it. This may be done in any number of ways, for example, making the hosts file manager executable file available on a server 130 for download. Once deployed, the hosts file manager, comprising various program modules operating in conjunction with a computer such as 141 and/or computer 300 from FIG. 3, may carry out steps 402-407.

Displaying a user interface 402 comprises causing a computer to present a user interface on a display surface of a monitor attached to the computer. An exemplary user interface is presented in FIGS. 6 and 7. The user interface may comprise a list of selectable server groups, said list comprising a first identification of a first server group that corresponds to a first Internet Protocol (IP) address, and a second identification of a second server group that corresponds to a second IP address.

Figure 7:
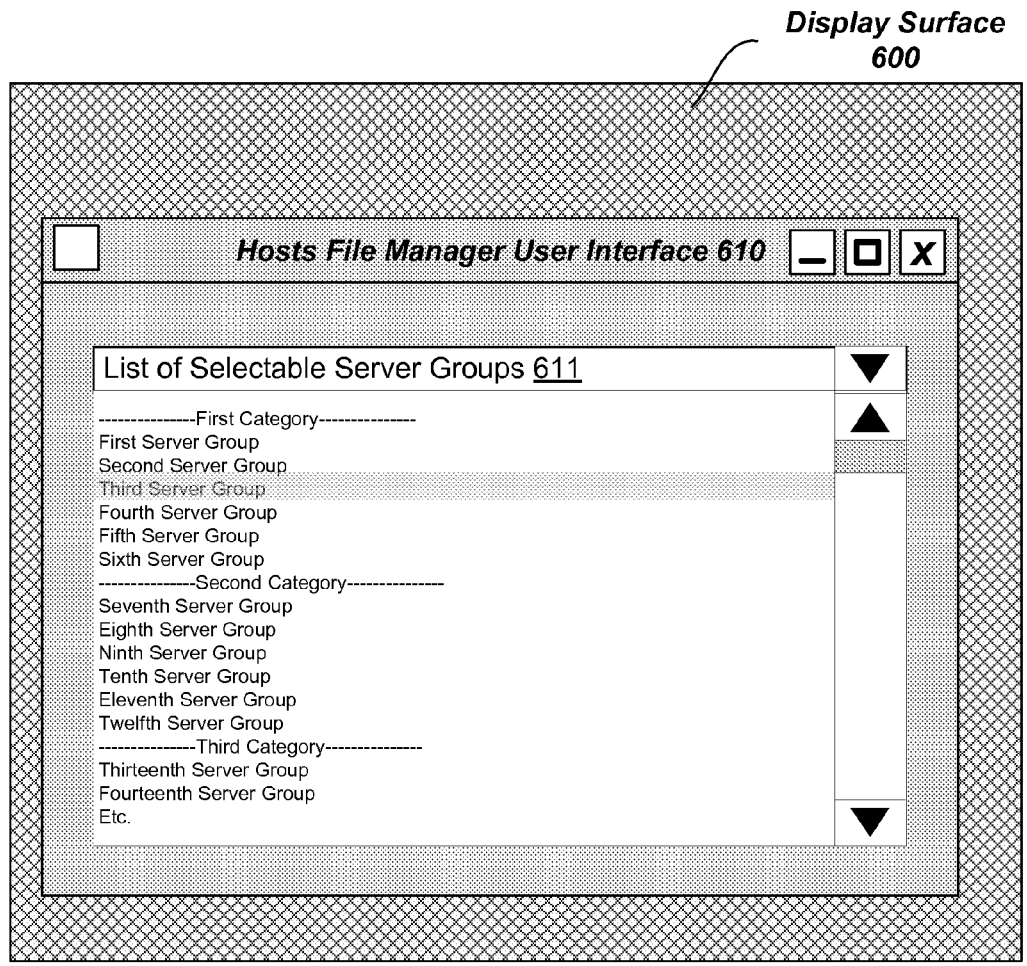
FIG. 7 illustrates a second view of the exemplary user interface presented in FIG. 6.

The list may be, for example, a drop-down list as illustrated in FIG. 7. The list presents identifications of server groups. While server groups could be identified by their IP addresses, IP addresses are difficult to remember and recognize. Therefore, instead human readable and recognizable identifiers, or "friendly names" are considered preferable in one embodiment. The identifiers may be conveniently broken into categories as illustrated in FIG. 7. This allows speedy navigation and identification of the server group that a user wishes to connect to. Behind the scenes, the hosts file manager has access to the precise IP addresses for each server group. This information is kept in the hosts file manager data. Thus, once a server group identifier is selected, the corresponding IP address can be placed into the computer's hosts file as the IP address for use with the common hostname for the enterprise.

Figure 6:
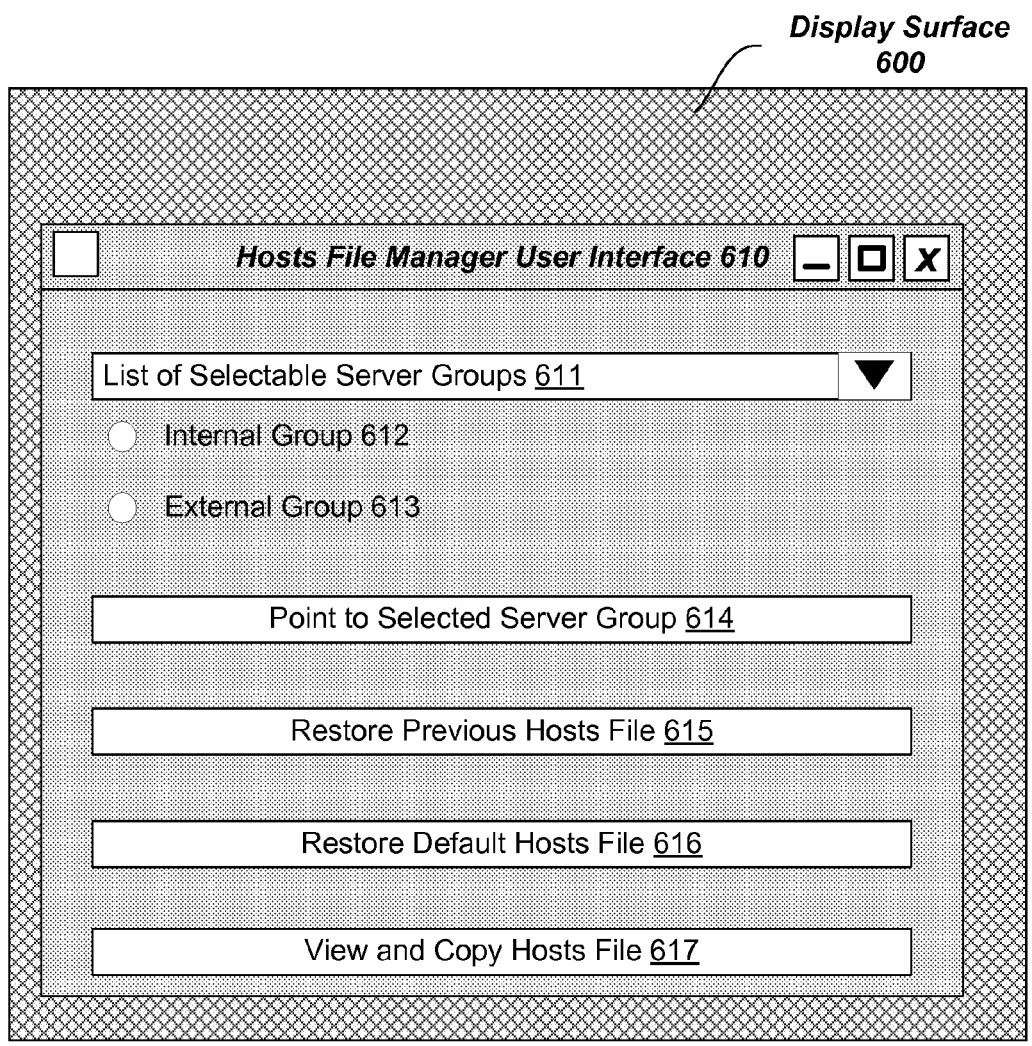
FIG. 6 illustrates an exemplary user interface as may be displayed during operation of an exemplary hosts file manager as disclosed herein.

A user may select a server group, e.g. a first user group, displayed on the user interface, and by virtue of such selection, the hosts file manager can receive, via said user interface a selection 403 of said first server group. Receipt of the user selection may be accomplished in a variety of ways as appreciated, using established techniques for configuring user interfaces. For example, the hosts file manager may use an active list that acts on a user selection the instant a user clicks on it. In another embodiment, as illustrated in FIG. 6, the hosts file manager may include a "point to selected server group" 614 button that activates said modifying a hosts file, allowing a user to first select a server group from list 611, then select button 614 to cause the hosts file manager to receive the selected group identifier.

The hosts file manager may next modify a hosts file 404. The modified hosts file will typically be the local hosts file for the computer upon which the hosts file manager is executing. However, this is not required and the modified hosts file could be that of a remote computer if the hosts file manager is configured for remote file modification.

Hosts file modification 404, in one embodiment, comprises modifying a hosts file to correlate a hostname with the IP address of the user's selected server group. This may comprise opening the hosts file, then inserting an entry that correlates a hostname with an IP address. The IP address is the IP address for the selected server group received in step 403. This IP address may be retrieved from hosts file manager data, and inserted as text in said hosts file. The hostname is, in one embodiment, the common hostname supported by the enterprise in which the particular embodiment is implemented. For example, if the enterprise is a financial institution, such as, e.g., Citibank, the hostname would typically be the hostname for the financial institution's website. Each of the server groups 110 and 120 supply services for said hostname in some way. They may be identical backups for the purposes of load distribution and data redundancy, or may offer distinct services.

Thus, in one embodiment, the user need not select a host name, the hosts file manager is preconfigured to use a default hostname that is the hostname for the enterprise. Other embodiments allowing user specification of a hostname prior to selection of the individual server group he wishes to point to are also possible as will be appreciated.

The hosts file as modified may be stored 405 to a computer readable medium using conventional approaches for data persistence.

The hosts file manager may also offer additional useful features, e.g., allowing for restoration of a previous hosts file 406, restoration of a default hosts file 407, copying the contents of a hosts file 408, and displaying contents of a hosts file 409. FIG. 6 illustrates corresponding aspects of a user interface implementing these features. Restoring a previous hosts file may be supported by configuring the hosts file manager to save a backup hosts file prior to modification 404. When the user indicates a desire to restore, the contents of the backup file can be written to the active hosts file. The contents of the active hosts file may be saved to a backup file prior to restoration, so that they can also be restored to the active file later on if necessary. Embodiments involving multiple backups may also be useful in some embodiments, for example allowing restoration of a backup file from a certain date. Similarly, restoring a default hosts file 407 may comprise writing contents of a file that is designated a default hosts file to an active hosts file.

Copying the contents of a hosts file 408 may comprise, for example, writing the contents of an active hosts file to a local computer system clipboard or other temporary memory location, from which such contents can be "pasted" or subsequently copied into other locations, for example, into an email, document, etc. Displaying contents of a hosts file 409 may comprise displaying such contents in a window that shows the contents in human-readable form. For example, an application such as notepad, Microsoft Word, or other application that allows display of text may be used.

Figure 5:
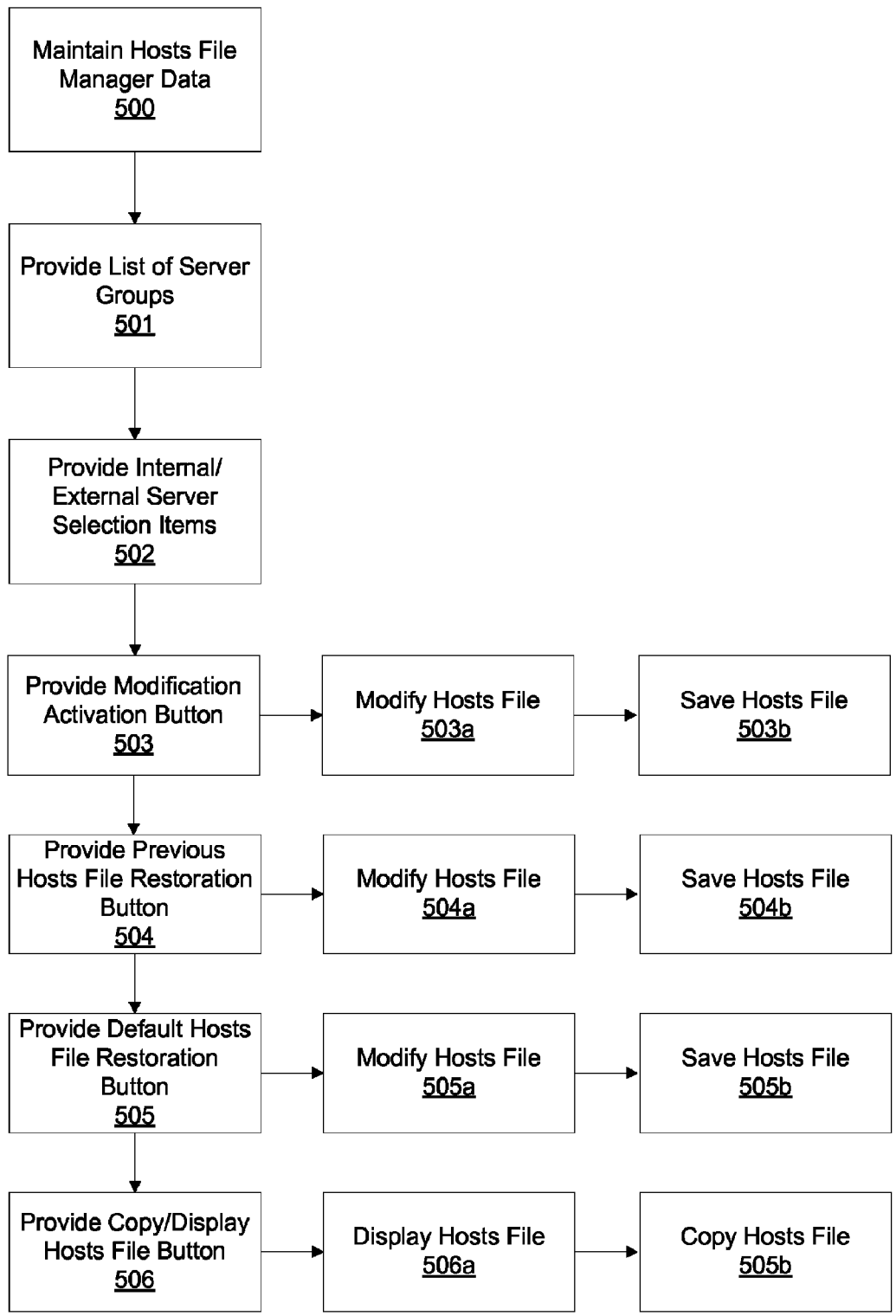
FIG. 5 illustrates steps of a method, as may be carried out as a method or implemented in the form of computing components or instructions stored on computer readable media, for providing and utilizing a user interface in accordance with disclosed embodiments.

FIG. 5 illustrates a method for managing a hosts file, comprising maintaining hosts file manager data 500, as described above with respect to FIG. 4. Steps 501-505 are directed to actions that may be carried out by a user interface such as illustrated in FIGS. 6 and 7. The user interface may provide a list of selectable server groups 501, each server group serving a common hostname, and each server group corresponding to a unique Internet Protocol (IP) address. An exemplary list of server groups is illustrated in FIG. 7.

The user interface 610 may further provide internal/external server selection items 502. These are illustrated in FIG. 6 as items 612 and 613. Occasionally, server groups having a common friendly name or identifier may in fact be two server groups with two IP addresses—one for "internal" operations internal to a particular enterprise, and one for "external" operations accessible from outside the enterprise. For example, the internal group may allow for additional options and control that is not available from outside. It is desirable, for example in testing such server groups, to be able to point to either the "internal" or "external" server group. Thus, options 612 and 613 may be presented when available. When there is only one server group that is not divided into internal and external IP addresses, the selection items can be grayed out or otherwise made unavailable.

The user interface 610 may further provide a button 614 that activates an automatic modification of a hosts file, as illustrated in step 503 of FIG. 5, by inserting an entry correlating said common hostname with a unique IP address associated with a selected one of said server groups. As illustrated in FIG. 5, selection of the button in step 503 can activate steps for modifying a hosts file 503*a* and saving the hosts file 503*b* as modified.

The user interface 610 may further provide a button 615 that restores said hosts file to a state preceding said modifying, as illustrated in step 504 of FIG. 5, for example by writing contents of a backup file to an active hosts file as described above. As illustrated in FIG. 5, selection of the button in step 504 can activate steps for modifying a hosts file 504*a* and saving the hosts file 504*b* as modified.

The user interface 610 may further provide a button 616 that restores said hosts file to a default state, as illustrated in step 505 of FIG. 5, for example by writing contents of a default hosts file to an active hosts file. As illustrated in FIG. 5, selection of the button in step 505 can activate steps for modifying a hosts file 505*a* and saving the hosts file 505*b* as modified.

The user interface 610 may further provide a button 617 that allows a user to do either or both of view and copy said hosts file, as illustrated in step 506 of FIG. 5, for example by writing contents of a hosts file to a system clipboard, in one embodiment, or networked memory location, in another embodiment. As illustrated in FIG. 5, selection of the button in step 506 can activate a display of a currently active hosts file 506*a* and can also copy the hosts file 506*b*.

The hosts file manager may also include, in one embodiment, a display component that displays to a user of a computer, e.g., computer 141, which server group he is connected to. For example, if a user launches the hosts file manager and modifies his hosts file such that his computer will connect to server group 110 when he navigates to the common hostname supported by server groups 110 and 120, then his computer and/or a secondary display can subsequently display an identification of the selected server group 110. For example, when he causes his browser to point to the common hostname, a pop-up window may appear stating the identifier and IP address for server group 110. Other display modes are also available, for example a strip of Light Emitting Diodes (LEDs) may be attached to the computer 141, with different color lights for the different server groups. The appropriate light can be turned on to represent to the user of computer 141 to which server group he is connected.

In light of the diverse computing environments that may be built according to the general framework of FIGS. 2 and 3, the systems and methods provided herein cannot be construed as limited in any way to a particular computing architecture. Instead, the invention should not be limited to any single embodiment, but rather should be construed in breadth and scope in accordance with the appended claims.

The invention claimed is:

1. A non-transitory computer readable medium bearing instructions for modifying a hosts file, comprising:

instructions for displaying a user interface comprising a list of selectable server groups broken into categories, said list comprising a first identification of a first server group that corresponds to a first Internet Protocol (IP) address, and a second identification of a second server group that corresponds to a second IP address, wherein the first and second identifications are recognizable identifiers and wherein the server groups are broken into categories based on a recognizable identifier associated with each server group;

instructions for receiving via said user interface a selection of said first server group;

instructions for modifying a hosts file to correlate a hostname with said first IP address, wherein said instructions for modifying a hosts file retrieve said first IP address from hosts file manager data, and insert said first IP address as text in said hosts file; and instructions for storing said hosts file, as modified, on a computer readable medium.

2. The computer readable medium of claim 1, further comprising instructions for adding to said list of selectable server groups a third identification of a third server group that corresponds to a third IP address, and updating said hosts file manager data with said third identification of a third server group and said third IF address.

3. The computer readable medium of claim 1, further comprising instructions for retrieving said list of selectable server groups from hosts file manager data available at a network location.

4. The computer readable medium of claim 1, wherein both said first server group and said second server group supply services for said hostname.

5. The computer readable medium of claim 1, wherein said user interface further comprises a button that activates said modifying a hosts file.

6. The computer readable medium of claim 1, wherein upon receiving said selection via said user interface, said user interface indicates whether said first server group is an internal server group or an external server group.

7. The computer readable medium of claim 1, wherein said user interface further comprises a button that restores said hosts file to a state preceding said modifying.

8. The computer readable medium of claim 1, wherein said user interface further comprises a button that copies contents of said hosts file to a clipboard.

9. The computer readable medium of claim 8, wherein said button that copies contents of said hosts file to a clipboard also activates a display of said contents.

10. A non-transitory computer readable medium bearing instructions for facilitating test access to server groups that supply services for a common hostname, said instructions comprising:

instructions for maintaining hosts file manager data comprising at least one Internet Protocol (IP) address for at least one server group;

instructions for deploying a hosts file manager to at least one computer wherein said hosts file manager data is maintained as part of hosts file manager and further comprising instructions for modifying said hosts file manager data, then redeploying said hosts file manager, said at least one computer having network access to said at least one server group;

instructions for receiving by said hosts file manager a selection of a first server group from said at least one server group, wherein said selection is made from a list including said at least one server group broken into at least one category based on a recognizable identifier associated with each of said at least one server group;

instructions for modifying by said hosts file manager a hosts file for said at least one computer by correlating, in said hosts file, an IP address for said first server group with said common hostname; and instructions for storing said hosts file as modified on a computer readable medium.

11. The computer readable medium of claim 10, wherein said hosts file manager data is maintained at a network location and further comprising retrieving, by said hosts file manager, said hosts file manager data.

12. The computer readable medium of claim 10, further comprising instructions for displaying by said hosts file manager a user interface comprising a list of selectable server groups, said list comprising said at least one server group.

13. The computer readable medium of claim 10, further comprising instructions for receiving by said hosts file manager a user command to perform said modifying.

14. The computer readable medium of claim 10, further comprising instructions for restoring by said hosts file manager said hosts file to a state preceding said modifying.

15. The computer readable medium of claim 10, further comprising instructions for restoring by said hosts file manager said hosts file to a default state.

16. The computer readable medium of claim 10, further comprising instructions for copying by said hosts file manager contents of said hosts file to a clipboard.

17. A non-transitory computer readable medium bearing instructions for managing a hosts file, comprising:

instructions for providing a list of selectable server groups, said list broken into at least one category based on a recognizable identifier associated with each server group, each server group serving a common hostname, and each server group corresponding to a unique Internet Protocol (IP);

instructions for providing a button that activates an automatic modification of a hosts file by inserting an entry correlating said common hostname with a unique IP address associated with a selected one of said server groups;

instructions for maintaining hosts file manager data comprising an identification of selectable server groups in said list and a unique IP address corresponding to each of said selectable server groups; and instructions for storing said hosts file as modified on a computer readable medium.

18. The computer readable medium of claim 17, further comprising instructions for performing said automatic modification of a hosts file.

19. The computer readable medium of claim 17, further comprising instructions for indicating whether a selected server group from said list is an internal server group or an external server group.

20. The computer readable medium of claim 17, further comprising instructions for providing a button that restores said hosts file to a state preceding said modifying.

21. The computer readable medium of claim 17, further comprising instructions for providing a button that restores said hosts file to a default state.

22. The computer readable medium of claim 17, wherein said automatic modification of a hosts file comprises retrieving a unique IP address from said hosts file manager data.

23. The computer readable medium of claim 17, further comprising instructions for providing a button that copies contents of said hosts file to a clipboard.

* * * * *